US012489881B1

(12) United States Patent
Kerekes

(10) Patent No.: US 12,489,881 B1
(45) Date of Patent: Dec. 2, 2025

(54) MULTI-USER PERSPECTIVE PROJECTION IN LOCATION-BASED ENTERTAINMENT

(71) Applicants: Sony Group Corporation, Tokyo (JP); Sony Pictures Entertainment Inc., Culver City, CA (US)

(72) Inventor: Joshua Kerekes, Toronto (CA)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 18/977,549

(22) Filed: Dec. 11, 2024

(51) Int. Cl.
*H04N 13/368* (2018.01)
*G09G 3/20* (2006.01)
*G09G 3/32* (2016.01)
*H04N 13/341* (2018.01)
*H04N 13/398* (2018.01)

(52) U.S. Cl.
CPC ......... *H04N 13/368* (2018.05); *G09G 3/2092* (2013.01); *G09G 3/32* (2013.01); *H04N 13/341* (2018.05); *H04N 13/398* (2018.05); *G09G 2310/06* (2013.01); *G09G 2310/08* (2013.01); *G09G 2320/0233* (2013.01); *G09G 2320/0686* (2013.01); *G09G 2340/0435* (2013.01); *G09G 2352/00* (2013.01); *G09G 2354/00* (2013.01)

(58) Field of Classification Search
CPC .................................................. H04N 13/368
USPC .......................................................... 348/52
See application file for complete search history.

(56) References Cited

U.S. PATENT DOCUMENTS

| | | | |
|---|---|---|---|
| 9,619,943 B2 | 4/2017 | Perez et al. | |
| 10,156,898 B2 | 12/2018 | Prosserman et al. | |
| 10,623,725 B2 | 4/2020 | Lau et al. | |
| 2011/0134231 A1* | 6/2011 | Hulvey | H04N 13/341 348/E13.059 |
| 2019/0243448 A1* | 8/2019 | Miller | G06F 3/011 |
| 2021/0271091 A1* | 9/2021 | Xu | G02B 27/017 |
| 2023/0229231 A1* | 7/2023 | Wu | G06F 3/011 345/156 |
| 2025/0095290 A1* | 3/2025 | Ascolese | H04N 5/74 |

* cited by examiner

*Primary Examiner* — Yulin Sun
(74) *Attorney, Agent, or Firm* — Procopio, Cory, Hargreaves & Savitch LLP

(57) ABSTRACT

Tracking and displaying personalized views of participants including: a plurality of pairs of active shutter glasses to be worn by the participants and is synchronized to an LED screen, wherein a shutter for each eye of each pair of the active shutter glasses is configured to allow light to transmit to each eye only during a correct sub-frame and block the light during all other sub-frames; a motion capture system to detect positions of the participants by tracking the plurality of pairs of active shutter glasses to generate tracking data; a plurality of render nodes coupled to the LED screen; a central controller to receive the tracking data to trigger discrete render processes of the plurality of render nodes for unique perspective of each participant, wherein the triggered discrete render processes render and transmit video in parallel to display video streams as sub-frames on the LED screen.

20 Claims, 7 Drawing Sheets

MULTI-USER PERSPECTIVE PROJECTION IN LOCATION-BASED ENTERTAINMENT

BACKGROUND

Field

The present disclosure relates to location-based entertainment, and more specifically to multi-user perspective projection in location-based entertainment.

Background

Many location-based entertainment (LBE) experiences utilize screens for linear or interactive media, but they do not account for the viewing perspective of individual participants thus resulting in distortion which breaks immersion. Virtual Reality offers complete immersion but reduces the impact of the shared experience and makes some participants uncomfortable.

Location-based entertainment (LBE) experiences that utilize computer-generated visuals, interactive media, and other digital content often struggle with creating an immersive experience for the participants. Currently, these experiences are typically projected from fixed, generic perspectives, using monoscopic displays that fail to account for the unique perspectives and interactions of each individual participant.

Furthermore, while Virtual Reality (VR) technology has shown promise in solving some of these issues, it has proven unsuccessful in LBE applications due to its inherent limitations. VR typically requires a solitary experience, which can detract from the shared nature of LBE experiences that often involve multiple participants interacting together.

Traditional 3D and immersive experiences have been limited to seated or theatrical settings. While large-scale LED screens have become popular, they often suffer from poor viewing angles, causing participants outside the optimal zone to miss out on the experience. Furthermore, fixed-perspective projection can lead to immersion-breaking parallax shifts when viewers move around the space, especially with stereoscopic content.

Some solutions can track multiple participants, but still only able to display a fixed view to all participants. Some solutions can track a single participant and display the correct perspective for that participant, but it looks incorrect to every other participant. Accordingly, there is a need for a solution that can dynamically track and render individual perspectives in real-time, enabling immersive experiences that accurately reflect each user's viewpoint.

SUMMARY

The present disclosure provides a solution for immersive experiences in shared environment, enabling multiple users to view correct perspective in real-time.

In one implementation, a system for tracking and displaying personalized views of participants in a shared environment is disclosed. The system includes: an LED screen; a plurality of pairs of active shutter glasses to be worn by a plurality of participants in the shared environment and is synchronized to the LED screen, wherein a shutter for each eye of each pair of the active shutter glasses is configured to allow light to transmit to each eye of each participant only during a correct sub-frame and block the light during all other sub-frames; a motion capture system to detect positions of the plurality of participants by tracking the plurality of pairs of active shutter glasses to generate tracking data; a plurality of render nodes coupled to the LED screen; a central controller to receive the tracking data to trigger discrete render processes of the plurality of render nodes for unique perspective of each participant, wherein the triggered discrete render processes render and transmit video in parallel to display video streams as sub-frames on the LED screen.

In another implementation, a system for tracking and displaying personalized views of participants on an LED screen is disclosed. The system includes: a plurality of pairs of active shutter glasses to be worn by a plurality of participants in a shared environment and is synchronized to the LED screen, wherein a shutter for each eye of each pair of the active shutter glasses is to allow light to transmit to each eye of each participant only during a correct sub-frame and block the light during all other sub-frames; a motion capture system to detect positions of the plurality of participants by tracking the plurality of pairs of active shutter glasses to generate tracking data; a plurality of render nodes coupled to the LED screen; a central controller to receive the tracking data to trigger discrete render processes of the plurality of render nodes for unique perspective of each participant including location, orientation, and inter-pupilar distance of each participant, wherein the triggered discrete render processes render and transmit video in parallel to display video streams as sub-frames on the LED screen.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As disclosed above, location-based entertainment (LBE) experiences that utilize computer-generated visuals, interactive media, and other digital content often struggle with creating an immersive experience for the participants. Accordingly, there is a need for an innovative solution that combines the benefits of computer-generated visuals and interactive media with the ability to create personalized and immersive experiences that engage multiple participants simultaneously.

Certain implementations of the present disclosure provide for an LBE system that overcomes the limitations of current technologies and enables users to participate in engaging and shared experiences. After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Figure 1A:
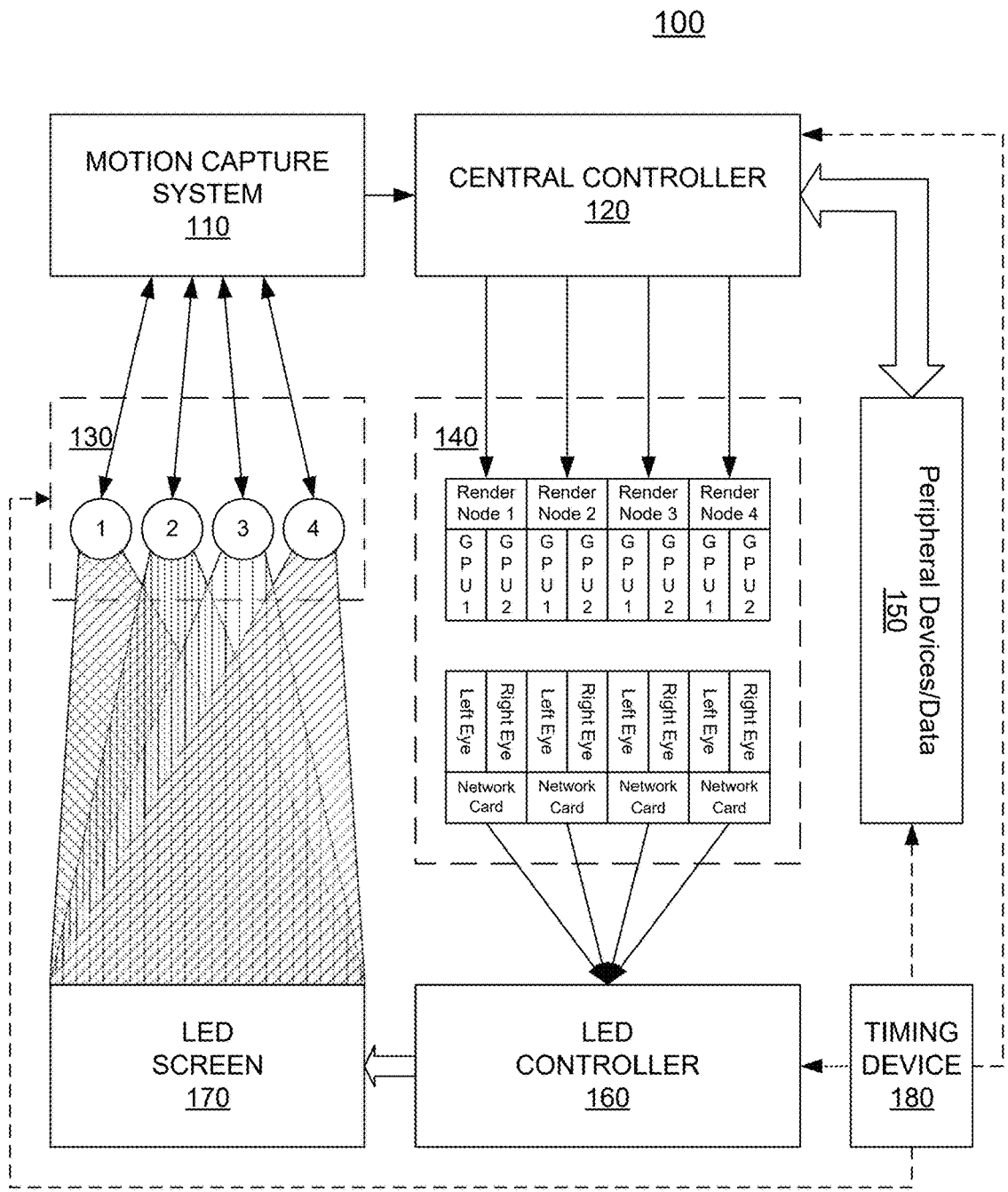
FIG. 1A is block diagram of a system for tracking positions of multiple participants in a shared environment and displaying a personalized view for each participant using active shutter glasses and a high refresh rate light-emitting diode (LED) screen in accordance with one implementation of the present disclosure.

FIG. 1A is block diagram of a system 100 for tracking positions of multiple participants in a shared environment and displaying a personalized view for each participant using active shutter glasses and a high refresh rate light-emitting diode (LED) screen in accordance with one implementation of the present disclosure. The system enables multiple participants to experience a shared environment with high fidelity and immersion, while also providing a personalized view for each individual participant.

In the illustrated implementation of FIG. 1A, the system 100 includes a motion capture system 110, a central controller 120, an active shutter system 130, a bank of render nodes 140, peripheral devices 150, an LED controller 160, an LED screen 170, and a timing device 180. In one implementation, the LED screen 170 is a high-refresh rate LED screen.

Figure 1B:
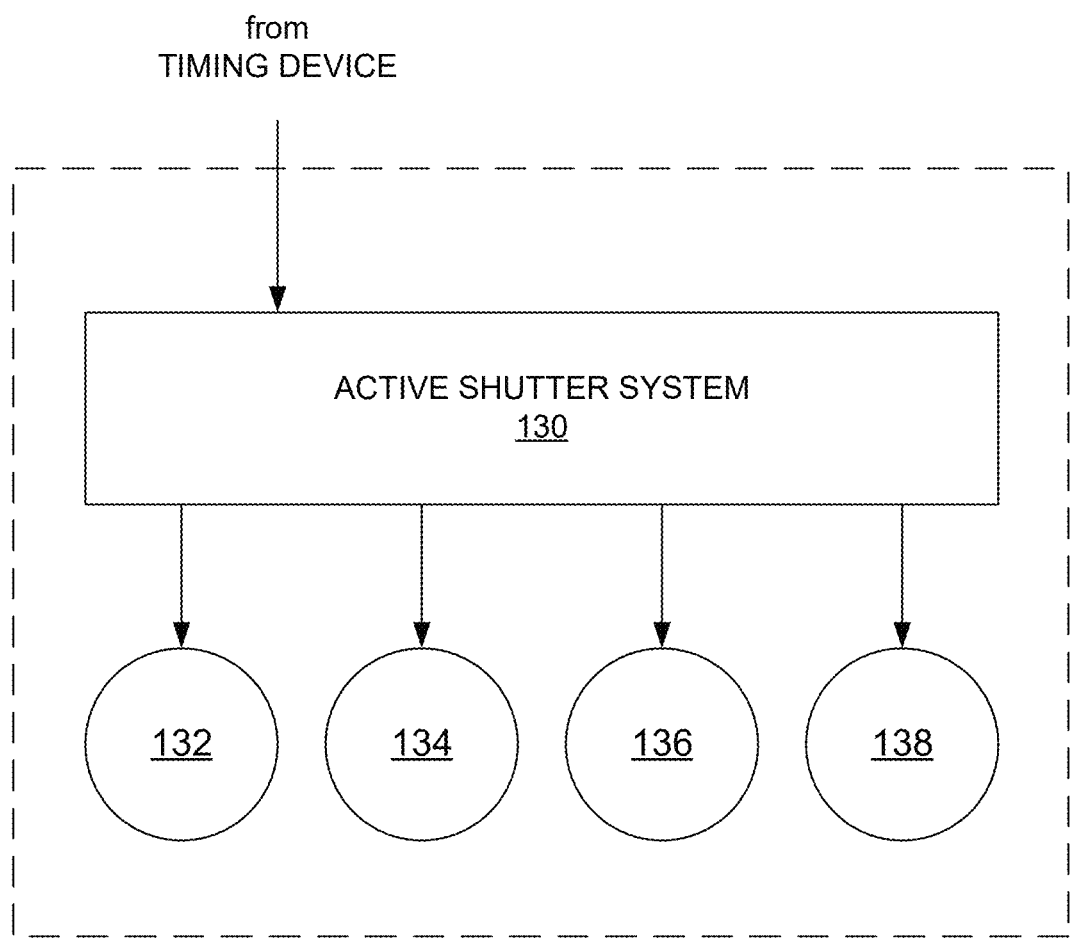
FIG. 1B is a detailed block diagram of the active shutter system in accordance with one implementation of the present disclosure.

FIG. 1B is a detailed block diagram of the active shutter system 130 in accordance with one implementation of the present disclosure. In one implementation, the active shutter system 130 receives a timing signal from the timing device 180 and interfaces/communicates with a plurality of active shutter glasses 132, 134, 136, 138 worn by the participants. In one implementation, the active shutter glasses 132, 134, 136, 138 are active 3-D glasses. In another implementation, the active shutter glasses 132, 134, 136, 138 are monoscopic glasses. In one implementation, each pair of the plurality of the active shutter glasses 132, 134, 136, 138 is synchronized to the LED screen 170 and is open only during the correct sub-frame which includes the view for the participant wearing the pair of glasses. Thus, the shutter operates to allow the light to transmit to each eye of the participant only during the correct sub-frame and block the light during all other sub-frames.

Referring again to FIG. 1A, the motion capture system 110 is configured to detect the position of each participant's head (on which active shutter glasses are worn) and transmit the information to the central controller 120. In one implementation, the motion capture system 110 includes optical motion capture sensors positioned on the perimeter of the shared environment (sometimes referred to as a motion capture volume) to capture the configuration of LEDs (e.g., 850 nm emitters) on the plurality of active shutter glasses 132, 134, 136, 138 and to determine the position and orientation of the participants with respect to the LED screen 170. In another implementation, the motion capture system 110 is a marker-less system which identifies a participant based on features of the participant and solves a skeleton which is used to inform the rendering location and orientation of the participant's head and approximate inter-pupilar distance.

In the illustrated implementation of FIG. 1A, the central controller 120 uses the tracking data received from the motion capture system 110 to trigger discrete render processes of the bank of render nodes 140 for each participant's unique perspective, considering the individual location, orientation, and inter-pupilar distance (i.e., the distance between the left and right eyes). In one implementation, the central controller 120 relays the tracking data to the appropriate render node to enable it to render (video streams) for gaze and position of each eye of the participant in relation to the LED screen 170 based on the tracked position of the participant. For example, a gaze of a participant may be calculated by measuring the orientation of the participant to the LED screen 170 based the position of the participant with respect to the LED screen 170. The gaze or position requirements are dependent on whether the view is monoscopic or stereoscopic. For monoscopic systems, the position and orientation to the center point between the viewer's pupils is required. For stereoscopic systems, each eye's discrete position and orientation is required.

In the illustrated implementation of FIG. 1A, the rendered video streams are transmitted in parallel and ingested by the LED controller 160, which operates to display the multiple video streams as sub-frames on the LED screen 170. In one implementation, the LED controller 160 receives video streams from the bank of render nodes 140 over Internet protocol (IP) video using real-time transport protocol (RTP). In another implementation, the video is provided through bare metal video connections (e.g., DisplayPort, HDMI) between render nodes and the LED controller 160. In yet another implementation, the LED controller is optional and the rendered video streams are transmitted directly to the LED screen.

In the illustrated implementation of FIG. 1A, the peripheral devices 150 store, process, and/or display the tracking data to and from the central controller 120, while the timing device 180 is implemented to synchronize at least systems/devices 120, 130, 150, 160. In one implementation, the systems/devices 120, 130, 150, 160 are synchronized using precision time protocol version 2 (PTPv2) or precision time protocol version 2.1 (PTPv2.1), tri-level sync (Genlock) and transistor-transistor logic (TTL), which uses transistors to alternate between voltages representing 0 and 1 or 'Off' and 'On' values.

Referring again to FIG. 1B, in one implementation, the plurality of active shutter glasses 132, 134, 136, 138 includes off-the-shelf radio frequency (RF) or infrared (IR) emitters used to synchronize left and right eyes to the respective sub-frames. In one implementation, the emitters utilize the Video Electronics Standards Association's (VESA) stereo standard which includes a 5V square wave at 50% duty cycle per eye. The leading edge of this pulse triggers the shutter to allow the light to transmit to the selected eye of the participant. Since the timing required for a stable multi-participant stereo operation is very precise and unconventional, a specific timing pulse is generated to align the transmittance of the active shutter with the correct sub-frame displayed on the LED screen 170. Since standard 3D glasses/emitters are only capable of transmitting light sequentially per eye, if a monocular experience is desired, custom glasses and emitters are required.

In the illustrated implementation of FIG. 1A, the LED screen 170 includes LED panels and integrated circuit (IC) drivers capable of operating at high frequencies. In one implementation, the LED panels use IC drivers capable of reaching high refresh rates in the kHz range (e.g., 12,000 Hz) and can maintain high refresh rates even at low brightness levels. Also, in one implementation, the IC drivers have a high internal resolution capable of 16-bit grayscale and efficient internal timing and current regulation. It is also preferable to have scrambled "on" time segments to effectively increase the perceived flicker frequency.

In some implementations, time multiplexing multiple sources may negatively impact image quality since the reduced exposure and transmittance time may impact the perceived brightness for the viewer. Key factors may include: (a) LED output intensity; (b) shutter light transmittance properties (transparency); and (c) the way the human visual system integrates light over time. For experiences with reduced viewer period and/or large number of viewers, an increase in the perceived brightness may be desirable. In one implementation, a viewer target brightness compensation is determined by dividing the target brightness by the per-viewer duty cycle. In another implementation, a viewer target brightness compensation is determined by dividing the target brightness by per-viewer duty cycle and then dividing by the transmittance percentage of the shutter. In another implementation, a viewer target brightness compensation is determined by dividing the target brightness by per-viewer duty cycle or divided by the transmittance percentage of the shutter and combined with a perceptual luminance compensation model to improve the perceived luminance and contrast.

One factor affecting image quality in the present implementation includes crosstalk, which may be quantified as the amount of an unwanted image bleeding from one viewer into an adjacent viewer's image. This artifact may be described as "doubling," "blurring," "ghosting," or flicker, in some cases. In one implementation, crosstalk is calculated based on the shutter transmittance rise and fall times. Further, this overlap amount is used to determine the minimum amount of time between viewer windows to reduce crosstalk. Once the minimum time between windows is determined, a guard band may be inserted for this period. In the present implementation, a guard band (see FIGS. 5 and 6) is an LED "off" state where no light or low light is emitted to ensure complete separation between viewer periods.

Another factor affecting image quality includes ensuring sufficient temporal resolution for each viewer window, which means ensuring that the LED pulses are of a high enough frequency to prevent or reduce the appearance of flicker to the viewer. Although the current implementation assumes the optimal LED rate per pulse (which is the reciprocal of the maximum achievable refresh rate per LED pulse), in practice, is heavily influenced by the LED circuitry and the current brightness emitted. That is, the lower the brightness, the lower the LED pulse frequency which results in a higher appearance of flicker to the viewer.

In one implementation, the current brightness values can be increased to maximize the LED pulse frequency, thus increasing the number of pulses per viewer window and the perceived frequency, which reduces flicker but may result in the loss of contrast. Thus, the current implementation determines the likelihood flicker or flicker fusion based on measuring the real-world LED pulses across multiple greyscale brightness values using a high precision photosensor to then determine the system constraints such as number of viewers and optimal brightness. Flicker fusion, also known as critical flicker fusion (CFF), is the minimum frequency at which a light source must flicker to prevent the human eye from perceiving it as separate flashes of light. If the LED pulses remain above this minimum frequency, the eye perceives the flickering light as steady and continuous.

Figure 2:
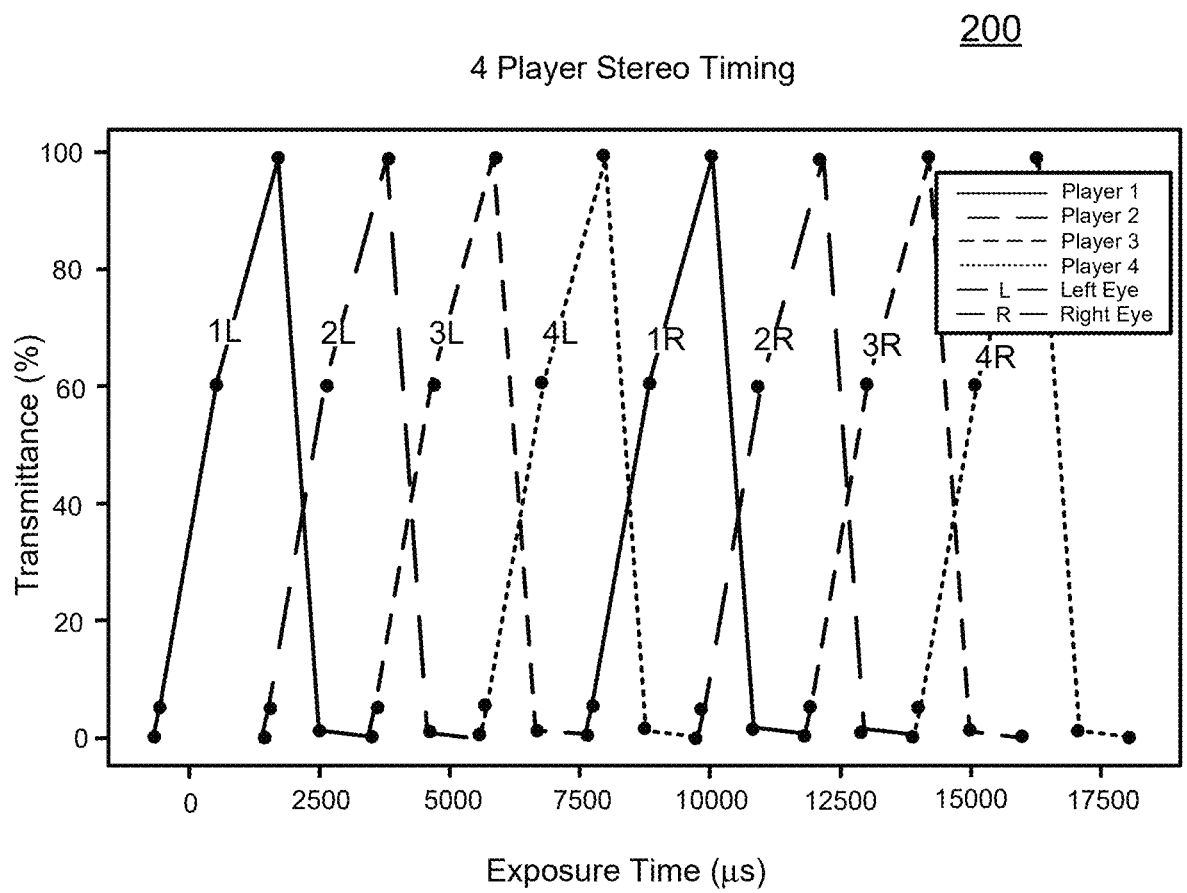
FIG. 2 is a timing diagram for a four-player stereo experience to align transmittance of an active shutter to align with a correct sub-frame displayed on the LED screen in accordance with one implementation of the present disclosure.

FIG. 2 is a timing diagram 200 for a four-player stereo experience to align transmittance of an active shutter to align with a correct sub-frame displayed on the LED screen in accordance with one implementation of the present disclosure.

In the illustrated implementation of FIG. 2, the leading edge of pulse 1L triggers the shutter to allow the light to transmit to the left eye of participant 1, while the falling edge of pulse 1L triggers the shutter to block the light. FIG. 2 also illustrates that the leading edge of pulse 2L triggers the shutter to allow the light to transmit to the left eye of participant 2, while the falling edge of pulse 2L triggers the shutter to block the light. FIG. 2 further illustrates that the leading edge of pulse 3L triggers the shutter to allow the light to transmit to the left eye of participant 3, while the falling edge of pulse 3L triggers the shutter to block the light. FIG. 2 further illustrates that the leading edge of pulse 4L triggers the shutter to allow the light to transmit to the left eye of participant 4, while the falling edge of pulse 4L triggers the shutter to block the light.

In the illustrated implementation of FIG. 2, the leading edge of pulse 1R triggers the shutter to allow the light to transmit to the right eye of participant 1, while the falling edge of pulse 1R triggers the shutter to block the light. FIG. 2 further illustrates that the leading edge of pulse 2R triggers the shutter to allow the light to transmit to the right eye of participant 2, while the falling edge of pulse 2R triggers the shutter to block the light. FIG. 2 further illustrates that the leading edge of pulse 3R triggers the shutter to allow the light to transmit to the right eye of participant 3, while the falling edge of pulse 3R triggers the shutter to block the light. FIG. 2 further illustrates that the leading edge of pulse 4R triggers the shutter to allow the light to transmit to the right eye of participant 4, while the falling edge of pulse 4R triggers the shutter to block the light.

Figure 3:
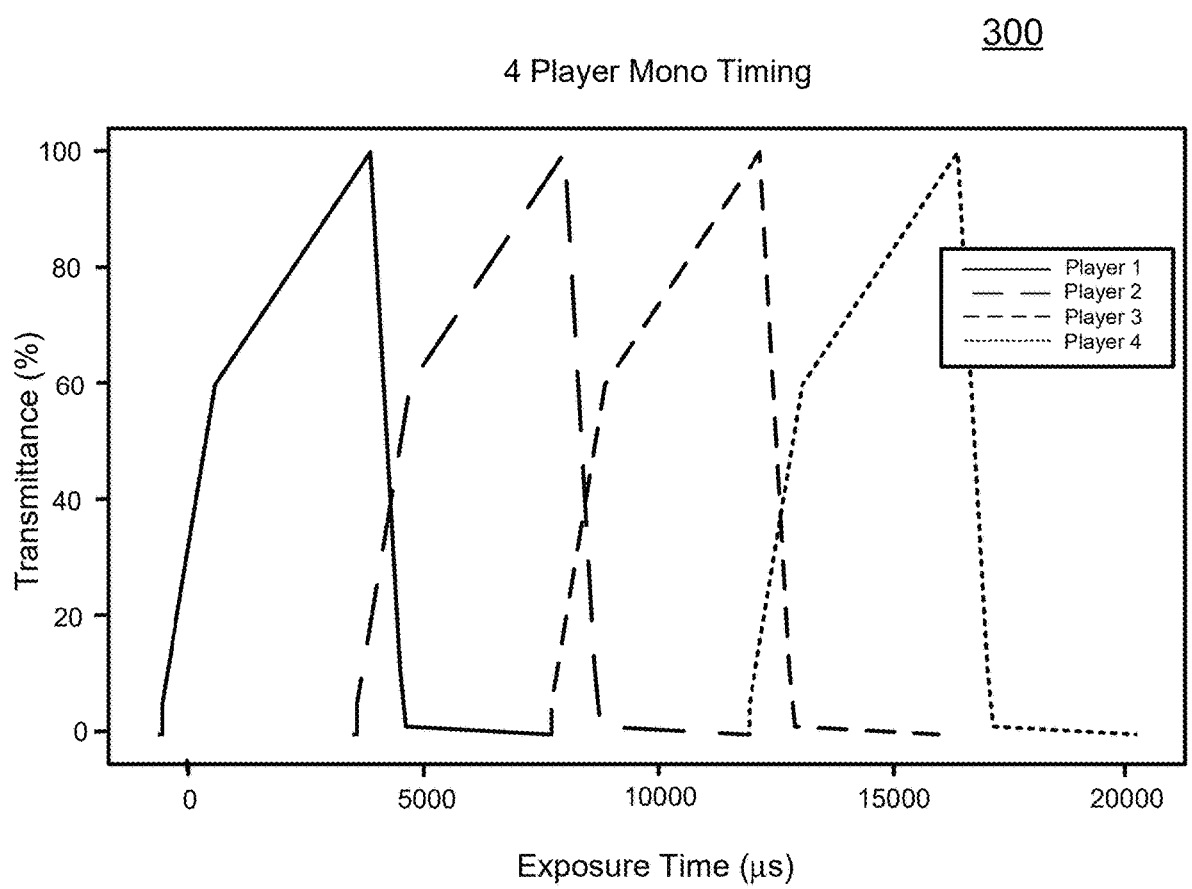
FIG. 3 is a timing diagram for a four-player single monocular experience in accordance with one implementation of the present disclosure.

FIG. 3 is a timing diagram 300 for a four-player single monocular experience in accordance with one implementation of the present disclosure.

The illustrated implementation of FIG. 3 shows that the single monocular experience doubles the exposure time from approximately 2500 μs (for the stereo experience) to 5000 μs. This doubling of the exposure time increases the perceived brightness.

Figure 4:
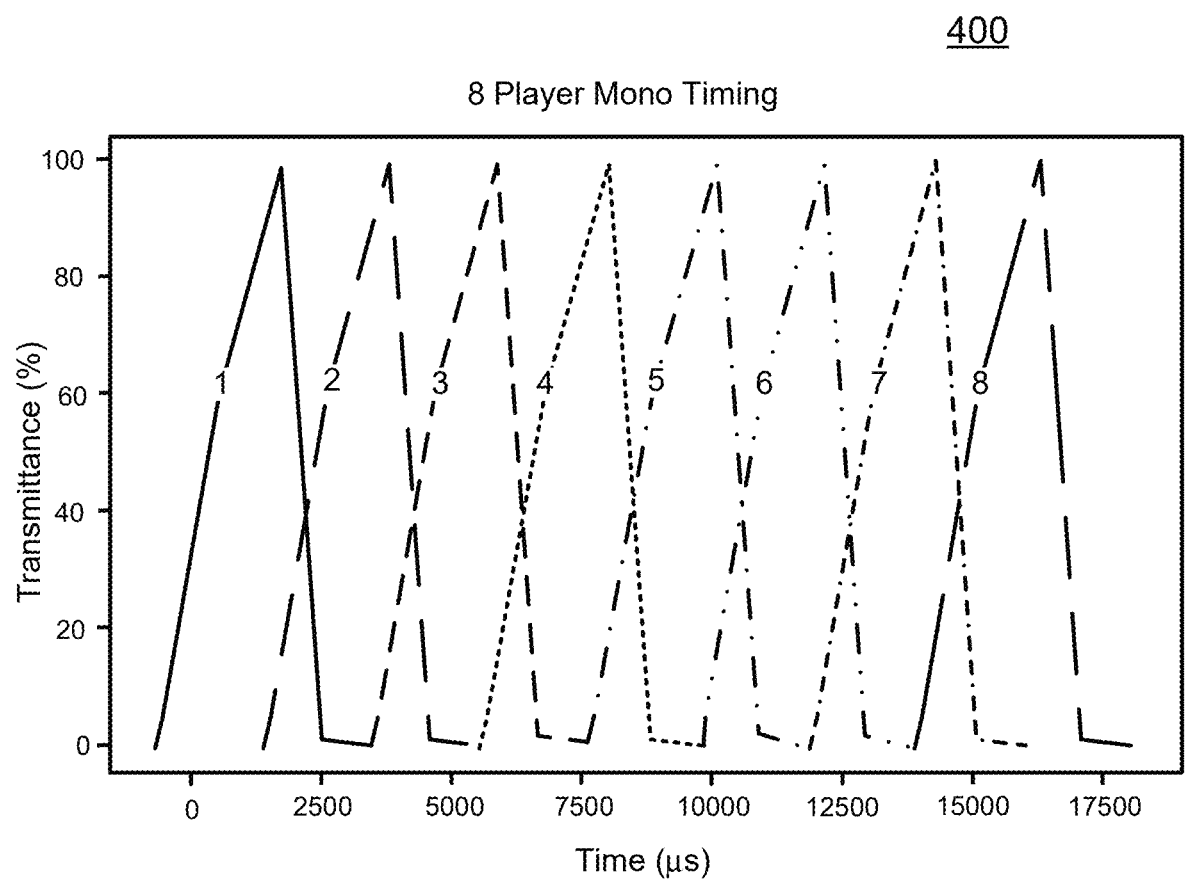
FIG. 4 is a timing diagram for an eight-player single monocular experience in accordance with one implementation of the present disclosure.

FIG. 4 is a timing diagram 400 for an eight-player single monocular experience in accordance with one implementation of the present disclosure.

Figure 5:
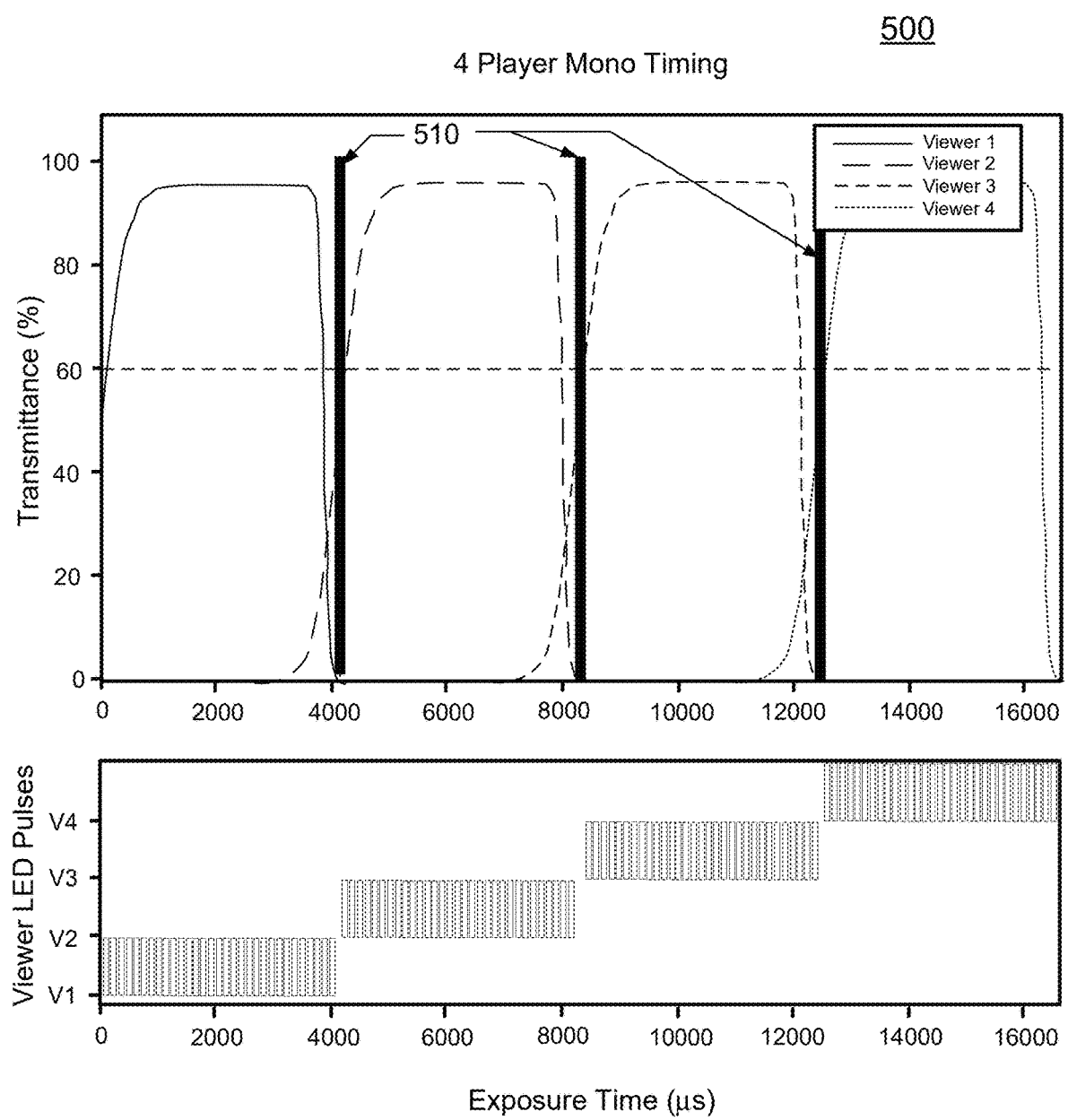
FIG. 5 is a timing diagram that details LED pulses in relation to a four-player single monocular experience and illustrates guard band placements.

FIG. 5 is a timing diagram 500 that details LED pulses in relation to a four-player single monocular experience and illustrates guard band placements 510. In this diagram the LED pulses on only during the active player window, during the crosstalk period (between the transmittance fall time and the adjacent viewer transmittance rise time) the LED is off ensuring no image bleed between viewer windows.

Figure 6:
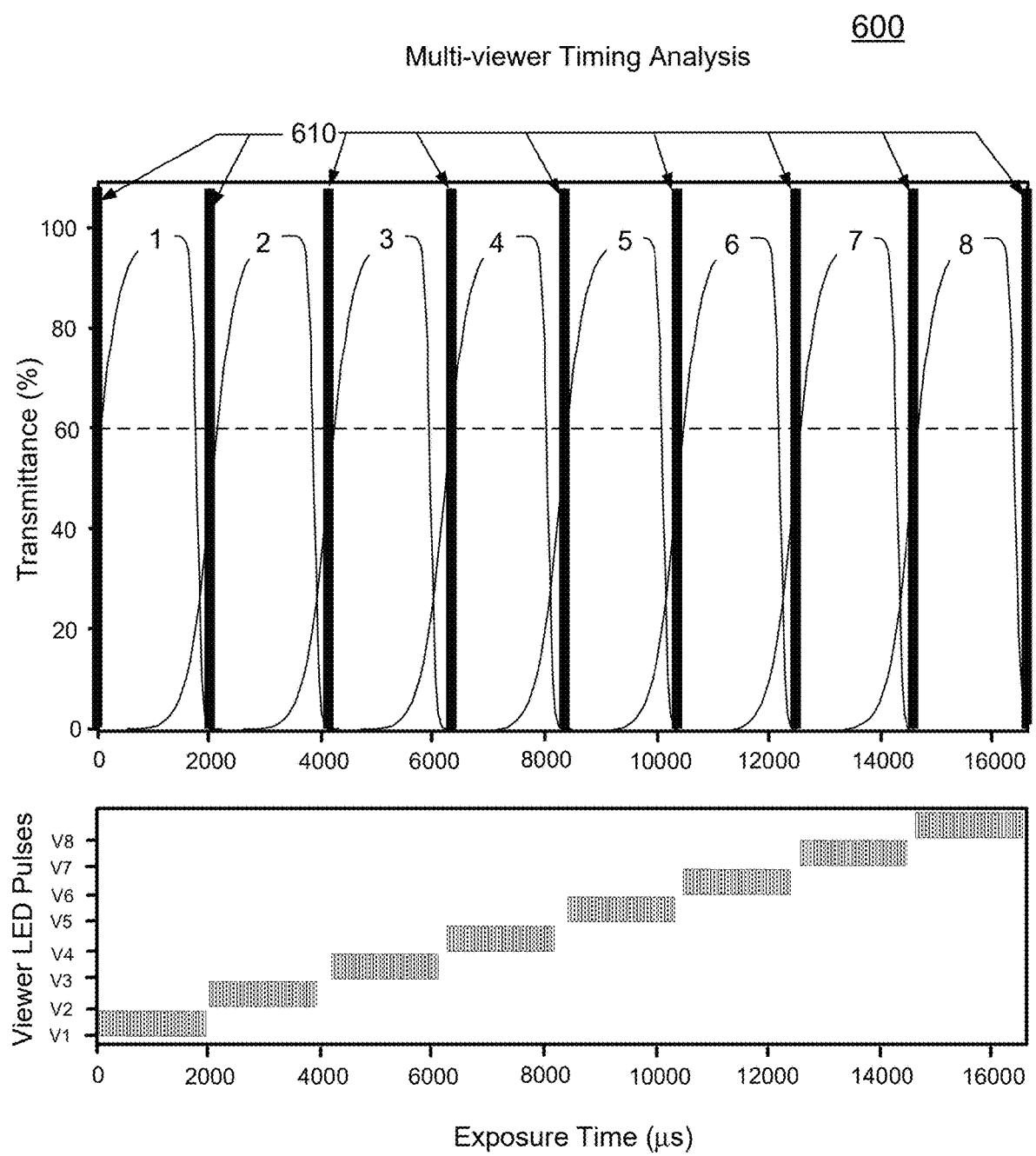
FIG. 6 is a timing diagram that details LED pulses in relation to an eight-player single monocular experience and illustrates guard band placements.

FIG. 6 is a timing diagram 600 that details LED pulses in relation to an eight-player single monocular experience and illustrates guard band placements 610. In this diagram the LED pulses only during the active player window, during the crosstalk period (between the transmittance fall time and the adjacent viewer transmittance rise time) the LED is off ensuring no image bleed between viewer windows.

In a particular implementation, a system for tracking and displaying personalized views of participants in a shared environment is disclosed. The system includes: an LED screen; a plurality of pairs of active shutter glasses to be worn by a plurality of participants in the shared environment and is synchronized to the LED screen, wherein a shutter for each eye of each pair of the active shutter glasses is configured to allow light to transmit to each eye of each participant only during a correct sub-frame and block the light during all other sub-frames; a motion capture system to detect positions of the plurality of participants by tracking the plurality of pairs of active shutter glasses to generate tracking data; a plurality of render nodes coupled to the LED screen; a central controller to receive the tracking data to trigger discrete render processes of the plurality of render nodes for unique perspective of each participant, wherein the triggered discrete render processes render and transmit video in parallel to display video streams as sub-frames on the LED screen.

In one implementation, the plurality of pairs of active shutter glasses includes one of an active 3-D glasses or monoscopic glasses. In one implementation, the unique perspective of each participant includes location, orientation, and inter-pupilar distance of each participant. In one implementation, the motion capture system includes optical motion capture sensors positioned on a perimeter of the shared environment to capture configurations of emitters disposed on the plurality of pairs of active shutter glasses and to determine head positions, orientations, and inter-pupilar distances of the plurality of participants with respect to the LED screen. In one implementation, the motion capture system detects head position, orientation, and inter-pupilar distance of each participant. In one implementation, the motion capture system is a marker-less system which identifies each participant based on features of each participant and solves a skeleton to determine the head position, the orientation, and the inter-pupilar distance of each participant. In one implementation, the central controller relays the tracking data to appropriate render nodes to render the video streams for gaze and position of each eye of each participant in relation to the LED screen. In one implementation, the system further includes an LED controller to receive the video streams transmitted in parallel by the plurality of render nodes and to display the video streams as sub-frames on the LED screen. In one implementation, the LED controller receives the video streams from the plurality of render nodes over Internet protocol (IP) video using real-time transport protocol (RTP). In one implementation, the LED controller receives the video streams from the plurality of render nodes through bare-metal display port connections between the plurality of render nodes and the LED controller. In one implementation, the system further includes a timing device to transmit a timing signal to the plurality of pairs of active shutter glasses, the central controller, and the LED controller to synchronize the video streams to the triggered discrete render processes and to the LED screen. In one implementation, the video streams are synchronized using one of precision time protocol version 2 (PTPv2), precision time protocol version 2.1 (PTPv2.1), tri-level sync (Genlock), or transistor-transistor logic (TTL). In one implementation, the plurality of pairs of active shutter glasses includes one of radio frequency (RF) or infrared (IR) emitters to synchronize left and right eyes to respective sub-frames. In one implementation, the LED screen includes LED panels and integrated circuit (IC) drivers capable of operating at high frequencies to drive the LED screen to a target brightness specified by the video and to maintain high refresh rates for the specified target brightness. In one implementation, a viewer target brightness is determined by dividing the target brightness by a per-viewer duty cycle. In one implementation, a viewer target brightness is determined by dividing the target brightness by a per-viewer duty cycle, and then dividing by a transmittance percentage of the shutter. In one implementation, a viewer target brightness is determined by dividing the target brightness by a per-viewer duty cycle, and then dividing by a transmittance percentage of the shutter combined with a perceptual luminance compensation model to improve the perceived luminance and contrast.

In another implementation, a system for tracking and displaying personalized views of participants on an LED screen is disclosed. The system includes: a plurality of pairs of active shutter glasses to be worn by a plurality of participants in a shared environment and is synchronized to the LED screen, wherein a shutter for each eye of each pair of the active shutter glasses is to allow light to transmit to each eye of each participant only during a correct sub-frame and block the light during all other sub-frames; a motion capture system to detect positions of the plurality of participants by tracking the plurality of pairs of active shutter glasses to generate tracking data; a plurality of render nodes coupled to the LED screen; a central controller to receive the tracking data to trigger discrete render processes of the plurality of render nodes for unique perspective of each participant including location, orientation, and inter-pupilar distance of each participant, wherein the triggered discrete render processes render and transmit video in parallel to display video streams as sub-frames on the LED screen.

In one implementation, the plurality of pairs of active shutter glasses includes one of radio frequency (RF) or infrared (IR) emitters to synchronize left and right eyes to respective sub-frames. In one implementation, the LED screen includes LED panels and integrated circuit (IC) drivers capable of operating at very high frequencies to drive the LED screen to a target brightness specified by the video and to maintain high refresh rates for the specified target brightness.

The descriptions herein of the disclosed implementations are provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware, or combinations of the foregoing. To clearly illustrate this interchangeability of hardware and software, various illustrative modules and method steps have been described herein generally in terms of their functionality. Whether such functionality is implemented as hardware or software depends upon a particular application and design constraints imposed on the overall system. Skilled persons can implement the described functionality in varying ways for each application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A system for tracking and displaying personalized views of participants in a shared environment, the system comprising:
   an LED screen;
   a plurality of pairs of active shutter glasses to be worn by a plurality of participants in the shared environment and is synchronized to the LED screen,
   wherein a shutter for each eye of each pair of the active shutter glasses is configured to allow light to transmit to each eye of each participant only during a correct sub-frame and block the light during all other sub-frames;
   a motion capture system to detect positions of the plurality of participants by tracking the plurality of pairs of active shutter glasses to generate tracking data;
   a plurality of render nodes coupled to the LED screen;
   a central controller to receive the tracking data to trigger discrete render processes of the plurality of render nodes for unique perspective of each participant,
   wherein the triggered discrete render processes render and transmit video in parallel to display video streams as sub-frames on the LED screen.

2. The system of claim 1, wherein the plurality of pairs of active shutter glasses includes one of an active 3-D glasses or monoscopic glasses.

3. The system of claim 1, wherein the unique perspective of each participant includes location, orientation, and inter-pupilar distance of each participant.

4. The system of claim 1, wherein the motion capture system includes optical motion capture sensors positioned on a perimeter of the shared environment to capture configurations of emitters disposed on the plurality of pairs of active shutter glasses and to determine head positions, orientations, and inter-pupilar distances of the plurality of participants with respect to the LED screen.

5. The system of claim 1, wherein the motion capture system detects head position, orientation, and inter-pupilar distance of each participant.

6. The system of claim 5, wherein the motion capture system is a marker-less system which identifies each participant based on features of each participant and solves a skeleton to determine the head position, the orientation, and the inter-pupilar distance of each participant.

7. The system of claim 1, wherein the central controller relays the tracking data to appropriate render nodes to render the video streams for gaze and position of each eye of each participant in relation to the LED screen.

8. The system of claim 1, further comprising an LED controller to receive the video streams transmitted in parallel by the plurality of render nodes and to display the video streams as sub-frames on the LED screen.

9. The system of claim 8, wherein the LED controller receives the video streams from the plurality of render nodes over Internet protocol (IP) video using real-time transport protocol (RTP).

10. The system of claim 8, wherein the LED controller receives the video streams from the plurality of render nodes through bare-metal display port connections between the plurality of render nodes and the LED controller.

11. The system of claim 8, further comprising
    a timing device to transmit a timing signal to the plurality of pairs of active shutter glasses, the central controller, and the LED controller to synchronize the video streams to the triggered discrete render processes and to the LED screen.

12. The system of claim 11, wherein the video streams are synchronized using one of precision time protocol version 2, precision time protocol version 2.1, tri-level sync, or transistor-transistor logic.

13. The system of claim 1, wherein the plurality of pairs of active shutter glasses includes one of radio frequency (RF) or infrared (IR) emitters to synchronize left and right eyes to respective sub-frames.

14. The system of claim 1, wherein the LED screen includes LED panels and integrated circuit (IC) drivers capable of operating at high frequencies to drive the LED screen to a target brightness specified by the video and to maintain high refresh rates for the specified target brightness.

15. The system of claim 14, wherein a viewer target brightness is determined by dividing the target brightness by a per-viewer duty cycle.

16. The system of claim 14, wherein a viewer target brightness is determined by dividing the target brightness by a per-viewer duty cycle, and then dividing by a transmittance percentage of the shutter.

17. The system of claim 14, wherein a viewer target brightness is determined by dividing the target brightness by a per-viewer duty cycle, and then dividing by a transmittance percentage of the shutter combined with a perceptual luminance compensation model to improve the perceived luminance and contrast.

18. A system for tracking and displaying personalized views of participants on an LED screen, the system comprising:
    a plurality of pairs of active shutter glasses to be worn by a plurality of participants in a shared environment and is synchronized to the LED screen,
    wherein a shutter for each eye of each pair of the active shutter glasses is to allow light to transmit to each eye of each participant only during a correct sub-frame and block the light during all other sub-frames;
    a motion capture system to detect positions of the plurality of participants by tracking the plurality of pairs of active shutter glasses to generate tracking data;

a plurality of render nodes coupled to the LED screen;
a central controller to receive the tracking data to trigger discrete render processes of the plurality of render nodes for unique perspective of each participant including location, orientation, and inter-pupilar distance of each participant,
wherein the triggered discrete render processes render and transmit video in parallel to display video streams as sub-frames on the LED screen.

19. The system of claim 18, wherein the plurality of pairs of active shutter glasses includes one of radio frequency (RF) or infrared (IR) emitters to synchronize left and right eyes to respective sub-frames.

20. The system of claim 18, wherein the LED screen includes LED panels and integrated circuit (IC) drivers capable of operating at high frequencies to drive the LED screen to a target brightness specified by the video and to maintain high refresh rates for the specified target brightness.

* * * * *